United States Patent
Kearney

(10) Patent No.: US 8,490,877 B2
(45) Date of Patent: Jul. 23, 2013

(54) DIGITAL-IMAGING BASED CODE SYMBOL READING SYSTEM HAVING FINGER-POINTING TRIGGERED MODE OF OPERATION

(75) Inventor: Sean Philip Kearney, Marlton, NJ (US)

(73) Assignee: Metrologic Instruments, Inc., Blackwood, NJ (US)

( * ) Notice: Subject to any disclaimer, the term of this patent is extended or adjusted under 35 U.S.C. 154(b) by 254 days.

(21) Appl. No.: 12/942,154

(22) Filed: Nov. 9, 2010

(65) Prior Publication Data

US 2012/0111945 A1    May 10, 2012

(51) Int. Cl.
*G06K 7/10* (2006.01)
(52) U.S. Cl.
USPC ............. 235/462.45; 235/454; 235/462.01; 235/462.1; 235/462.11; 235/472.01
(58) Field of Classification Search
USPC ...... 235/454, 462.01–462.45, 472.01–472.03
See application file for complete search history.

(56) References Cited

U.S. PATENT DOCUMENTS

| | | | |
|---|---|---|---|
| 4,766,299 A * | 8/1988 | Tierney et al. | 235/462.21 |
| 5,270,820 A | 12/1993 | Fellinger | |
| 5,340,972 A * | 8/1994 | Sandor | 235/462.44 |
| 5,914,476 A | 6/1999 | Gerst, III et al. | |
| 6,202,930 B1 * | 3/2001 | Plesko | 235/462.43 |
| 6,619,549 B2 | 9/2003 | Zhu et al. | |
| 7,128,266 B2 | 10/2006 | Zhu et al. | |
| 7,170,490 B2 | 1/2007 | Wilke | |
| 7,542,586 B2 | 6/2009 | Johnson | |
| 7,627,178 B2 | 12/2009 | Suzuki et al. | |
| 7,680,295 B2 | 3/2010 | Yoda et al. | |
| 7,702,130 B2 | 4/2010 | Im et al. | |
| 2003/0137486 A1 | 7/2003 | Wilke | |
| 2005/0099382 A1 | 5/2005 | Bourges et al. | |
| 2006/0202950 A1 | 9/2006 | Lee et al. | |
| 2008/0087734 A1 * | 4/2008 | Wang | 235/472.01 |
| 2008/0100570 A1 | 5/2008 | Friedrich et al. | |
| 2008/0314985 A1 | 12/2008 | Kotlarsky et al. | |
| 2010/0090947 A1 | 4/2010 | Underkoffler et al. | |
| 2012/0111945 A1 | 5/2012 | Kearney | |

* cited by examiner

*Primary Examiner* — Thien M Le
*Assistant Examiner* — April Taylor
(74) *Attorney, Agent, or Firm* — Summa, Additon & Ashe, P.A.

(57) ABSTRACT

A digital-imaging based system for and method of reading graphical indicia, including code symbols, on objects such as, but not limited to, code symbol menus by the user simply pointing his or her finger at the particular code symbol on the code symbol menu to be read, while digital images of the code symbol menu and the pointing finger are automatically captured, buffered and processed.

23 Claims, 11 Drawing Sheets

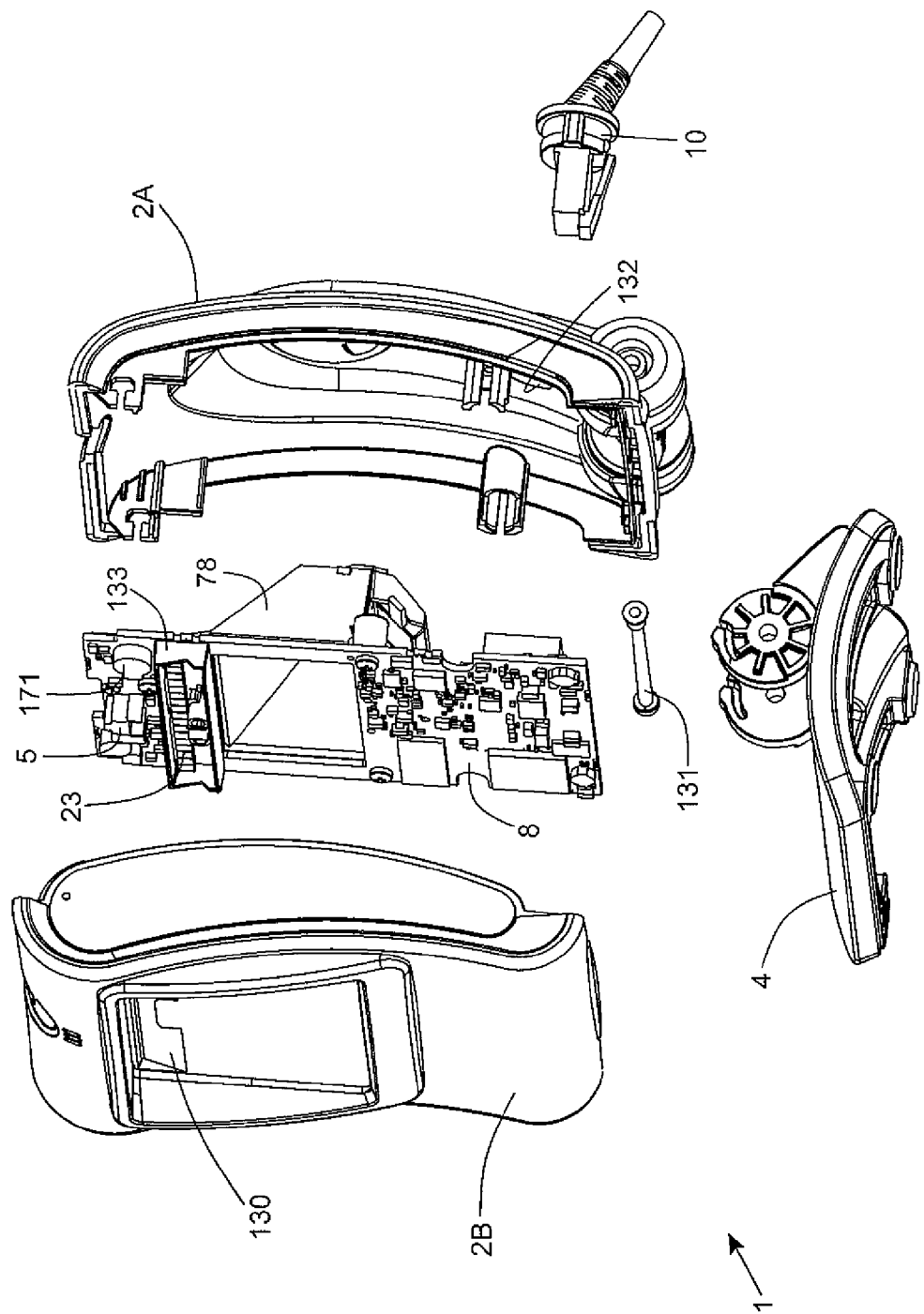

DIGITAL-IMAGING BASED CODE SYMBOL READING SYSTEM HAVING FINGER-POINTING TRIGGERED MODE OF OPERATION

BACKGROUND

1. Field

The present disclosure relates to digital imaging systems having a mode of intelligently processing digital images of one-dimensional (1D) and two-dimensional (2D) bar code symbols, to perform advanced system functions and meet demanding end-user application requirements particularly at point of sale (POS) environments.

2. Brief Description of the State of the Art

There is a growing need to scan bar code menus in various application environments.

For example, the use of bar code menus can be found in the receiving area of a supermarket. There, soda vendors provide a sheet/menu of product bar codes which the receiver must scan to enter a product into inventory. Each bar code must be scanned individually, and often not, all the bar codes on the sheet need to be scanned.

Typically, laser based bar code scanners generate a narrow plane of light which helps the user point to and aim at the bar code of interest on a bar code menu. However, digital imaging based products typically capture an entire page of bar codes on the menu, within a single digital image, making it uncertain which bar code(s) should be scanned for application at hand, based on the intentions of the user.

Currently, the only solution to this problem is to analyze a narrow region of interest (ROI) within the center of captured digital image of the bar code menu. Typically, this is achieved using a targeting scheme which assists the user to center the bar code of interest within the center of the field of view of the digital imager. This technique requires coordination of the narrow light beam with the bar code intended to be read, which can be difficult and time consuming when multiple bar codes must be read from same bar code menu.

Thus, there is a great need in the art for an improved method of and apparatus for reading bar code symbols on objects, such as bar code symbol menus, using digital image capture and processing techniques which avoid the shortcomings and drawbacks of prior art apparatus and methodologies.

OBJECTS AND SUMMARY

Accordingly, a primary object of the present disclosure is to provide a novel method of and apparatus for enabling the selection and reading of 1D and 2D bar code symbologies on a bar code menu using advanced image capture and processing techniques, which avoid the shortcomings and drawbacks of prior art apparatus and methodologies.

Another object is to provide a novel digital imaging system having a bar code symbol reading mode which allows a user to determine which bar code symbol on a printed bar code menu should be automatically read by the system when the user simply points his or her finger at the particular bar code symbol on the bar code symbol menu which he or she intends to be read.

Another object is to provide a digital imaging system, wherein the user uses his or her finger to point to a particular bar code on a printed bar code menu sheet, which the user intends to be read in an automatic manner, through the capture and processing of one or more digital images of the field of view (FOV) of the system in which the bar code menu is present.

Another object is to provide a digital imaging system, wherein the user uses his or her finger to point to a region of interest on a bar code menu sheet, while digital images of objects, including a user's finger pointing to a bar code symbol on the menu sheet, are captured, buffered and processed so as to automatically read the bar code symbol or other graphical indicia contained in the region of interest to which the user's finger points.

Another object is to provide a method of and digital imaging system for reading symbols on a bar code symbol menu, employing the capture and processing digital images of an entire bar code symbol menu while the user simply points to the bar code symbol of interest with his or her finger, and the digital image processor automatically identifies the pointing finger as an object within the captured digital image, locates the coordinates of the region of interest (ROI) adjacent the detected pointing finger, and decode processes pixel data contained in the ROI so as to read the bar code symbol that is located adjacent to the detected pointing finger close to the ROI.

Another object of the present invention is to provide a method of and digital imaging system for reading bar code symbols on a bar code menu, wherein when a bar code symbol menu sheet is presented on a table surface for the digital imaging system, and the user only needs to point his or her finger to each bar code he or she wishes to read.

Another object of the present invention is to provide a method of and digital imaging system for reading bar code symbols, wherein the system automatically detects any pauses in the movement of the user's pointing finger, and in response thereto, automatically detects the region of interest (ROI) to which the detected finger is pointing, and attempts to decode one or more bar code symbols graphically represented in the pixels contained therein.

Another object of the present invention is to provide a method of and digital imaging system for reading bar code symbols, wherein after reading a first bar code symbol in a region of interest (ROI) to which the user points his or her finger, the system automatically detects the movement of the pointing finger in the field of view, and then automatically reattempts to read another bar code symbol in another region of interest to which the pointing finger points.

Another object of the present invention is to provide a method of and digital imaging system for reading bar code symbols, which can be used in a presentation mode of operation where a bar code menu sheet is placed on a table or countertop surface within the field of view (FOV) of the system, and the user simply points to the bar code on the sheet to be automatically read.

These and other objects will become more apparent hereinafter and in the Claims appended hereto.

BRIEF DESCRIPTION OF THE DRAWINGS

For a more complete understanding of how to carry out the objects described above, the following Detailed Description of the Illustrative Embodiments should be read in conjunction with the accompanying Drawings, briefly described below.

FIG. 2B is a second perspective/exploded view of the digital imaging system of the illustrative embodiment shown in FIG. 1;

DETAILED DESCRIPTION OF THE ILLUSTRATIVE EMBODIMENT

Figure 1:
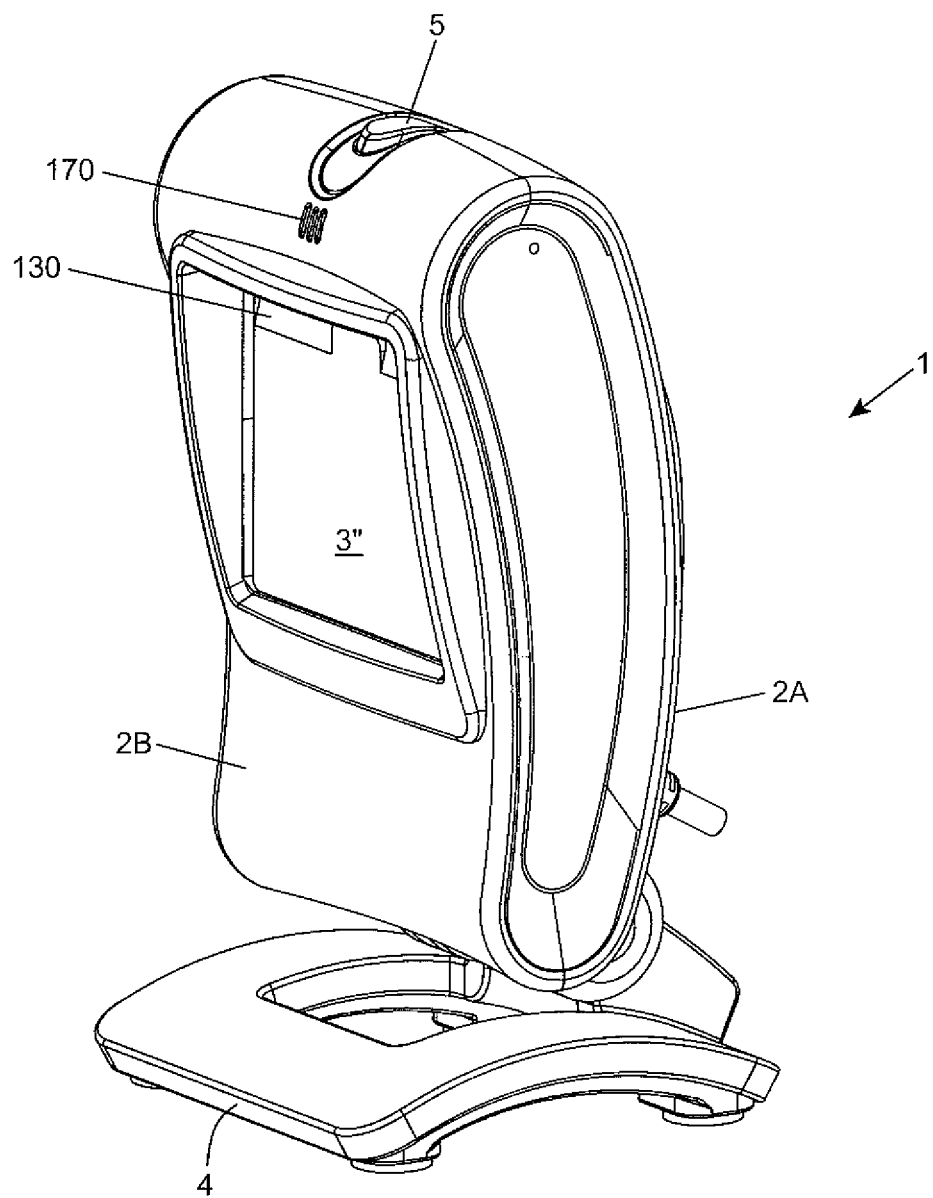
FIG. 1 is a perspective view of an illustrative embodiment of the hand/countertop supportable digital-imaging based bar code symbol reading system of the present disclosure, wherein, upon its automatic object detection subsystem automatically detecting the presence of an object (e.g. bar code menu) within its field of view (FOV), its LED-based illumination subsystem illuminates the object within the FOV while its image formation and detection subsystem forms and detects one or more digital images of the object, while its digital image processing subsystem automatically processes the digital images and detects the presence of the user's finger pointing to a region of interest (ROI) close to the pointing finger, so that the pixel data in this ROI can be automatically decode-processed so that any bar code symbol graphically represented therein will be read, and corresponding symbol character data generated for transmission to and use by the host computing system.

Referring to the figures in the accompanying Drawings, the illustrative embodiment of the digital imaging system will be described in greater detail, wherein like elements will be indicated using like reference numerals.

Referring now to FIGS. 1 through 2B, an illustrative embodiment of the digital imaging bar code symbol reading system 1 will be described in detail.

In general, the digital imaging system of the illustrative embodiment 1 is capable of reading one or more bar code symbols on a bar code menu by a method simply involving the user pointing at the bar code symbol intended to be read, while digital images are being captured of objects within the field of view (FOV), without the need to actuate a manually-actuated trigger switch used in conventional systems.

As shown in FIGS. 1, 2 and 2B, the digital imaging system of the illustrative embodiment 1 comprises: a hand/counter-top supportable housing 2 having (i) a front housing portion 2B with a window aperture 6 and an imaging window panel 3 installed therein, and (ii) a rear housing portion 2A. As shown, a single PC board based optical bench 8 (having optical subassemblies mounted thereon) is supported between the front and rear housing portions 2A and 3B which, when brought together, form an assembled unit. A base portion 4 is connected to the assembled unit by way of a pivot axle structure 131 that passes through the bottom portion of the imager housing and the base portion so that the hand-supportable housing and base portion are able to rotate relative to each other. The host/imager interface cable 10 passes through a port 132 formed in the rear of the rear housing portion, and interfaces with connectors mounted on the PC board 8.

In general, the digital-imaging based system 1 can be used in both hand-supportable and counter-top supportable modes of operation.

When operated in its hand-supportable mode of operation, the system 1 supports several different modes of operation, namely: (i) a manually-triggered mode of bar code symbol reading operation; (ii) an automatically-triggered mode of bar code symbol reading operation; and (iii) and an automatic finger-pointing triggered mode of bar code symbol reading operation.

Figure 4A:
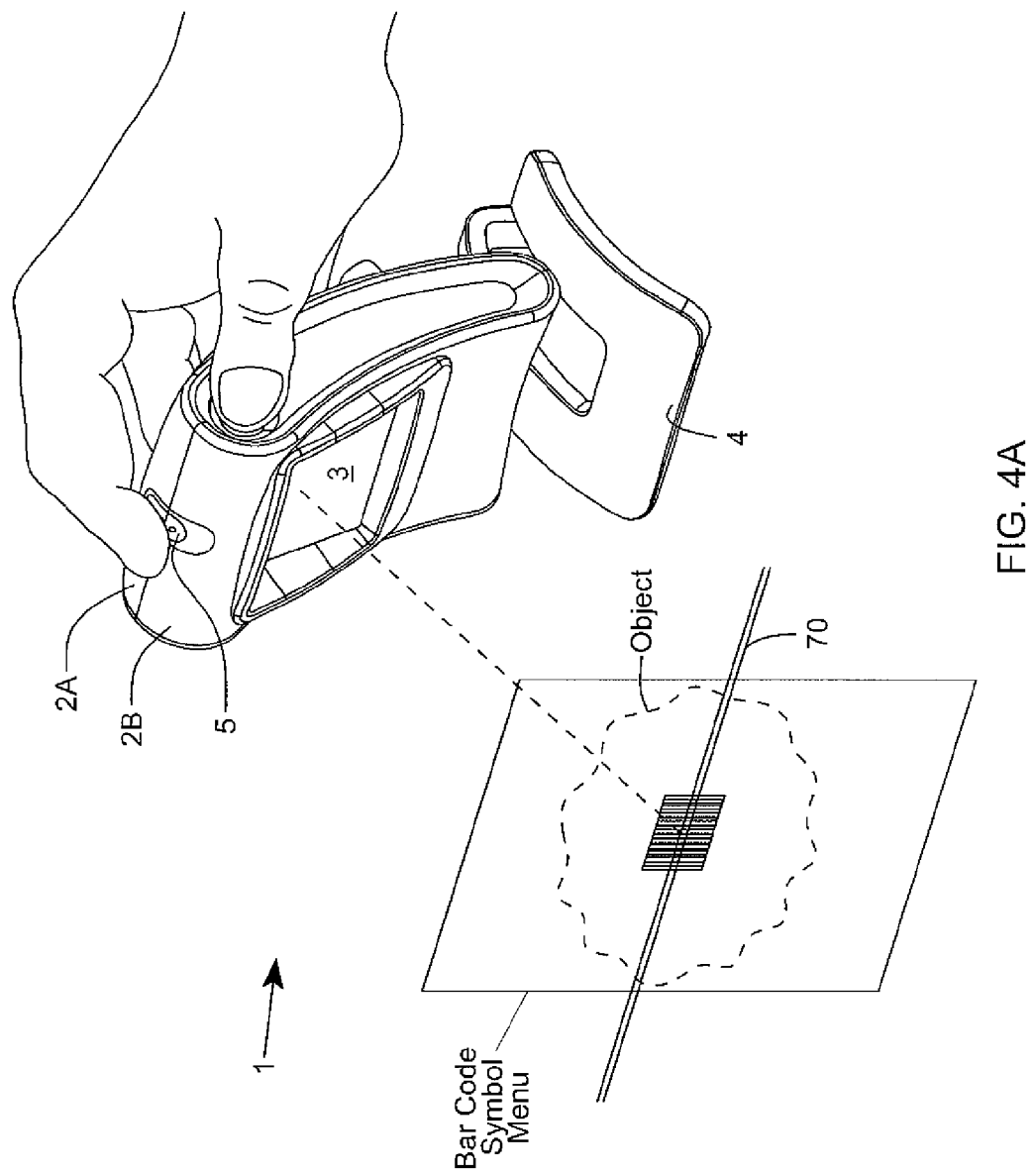
FIG. 4A is a perspective view of the digital imaging system of FIG. 1, shown imaging a bar code menu bearing plurality of bar code symbols printed on a substrate, while the user is pointing at a particular bar code symbol to be automatically selected and read by the system.

During the manually-triggered mode of operation, the user picks up the system 1 as shown in FIG. 4A, and moves the system in proximity with an object bearing a code symbol, and the object is automatically detected, causing a visible targeting beam to be generated across the FOV, and when the targeting illumination beam is aligned with a bar code symbol, the user depresses switch 5 to manually cause the object in the FOV to be illuminated with LED-based illumination while one or more digital images thereof are captured (in a snap-shot or video mode), and buffered and processed in an effort to read the bar code symbol. The manually-triggered mode of bar code symbol reading operation is described in detail in copending US Publication No. 20080314985 A1, incorporated herein by reference in its entirety.

Figure 4B:
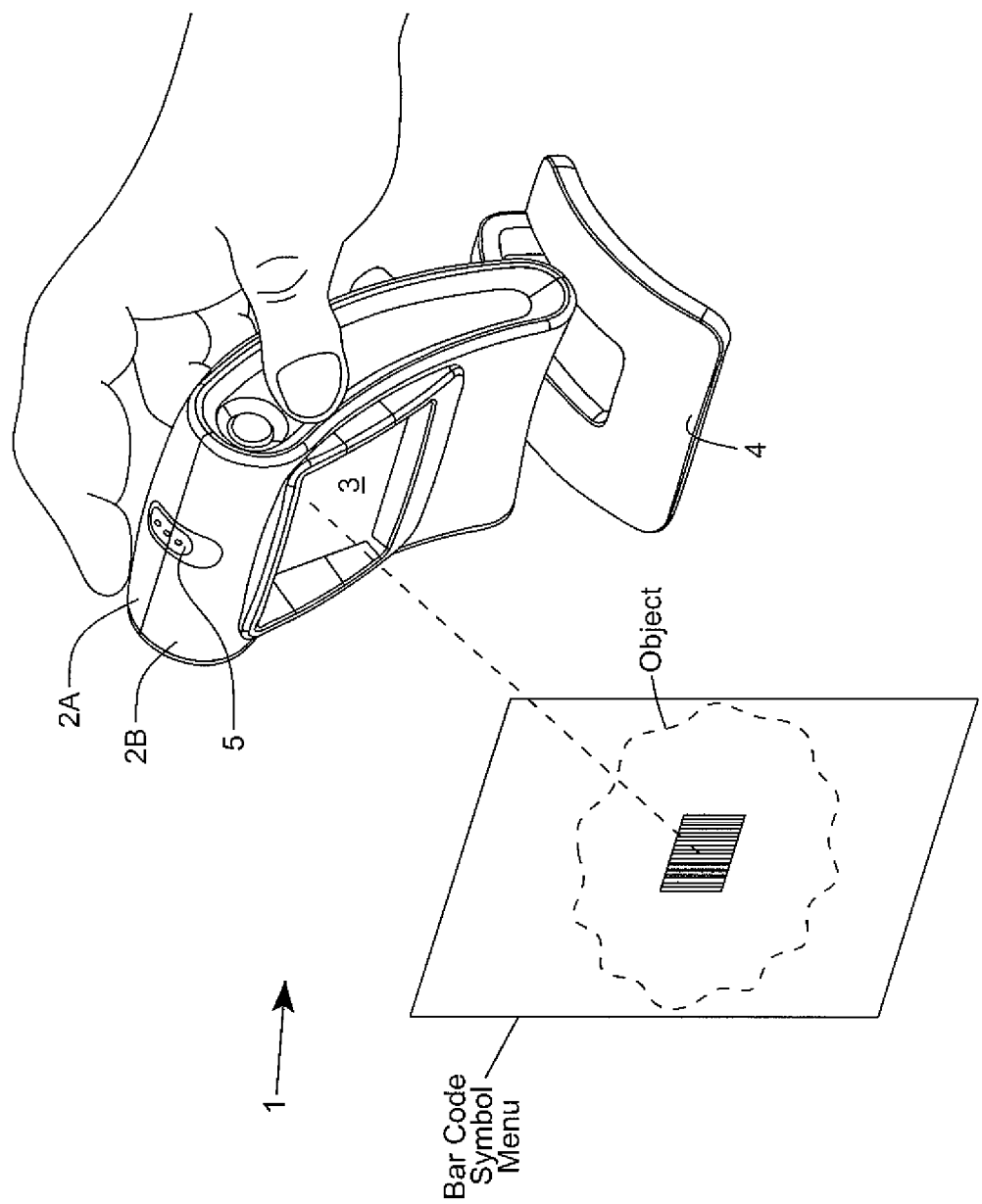
FIG. 4B is a perspective view of the digital imaging system of FIG. 1 shown detecting an object while the user moves the system in proximity with the object.
Figure 4C:
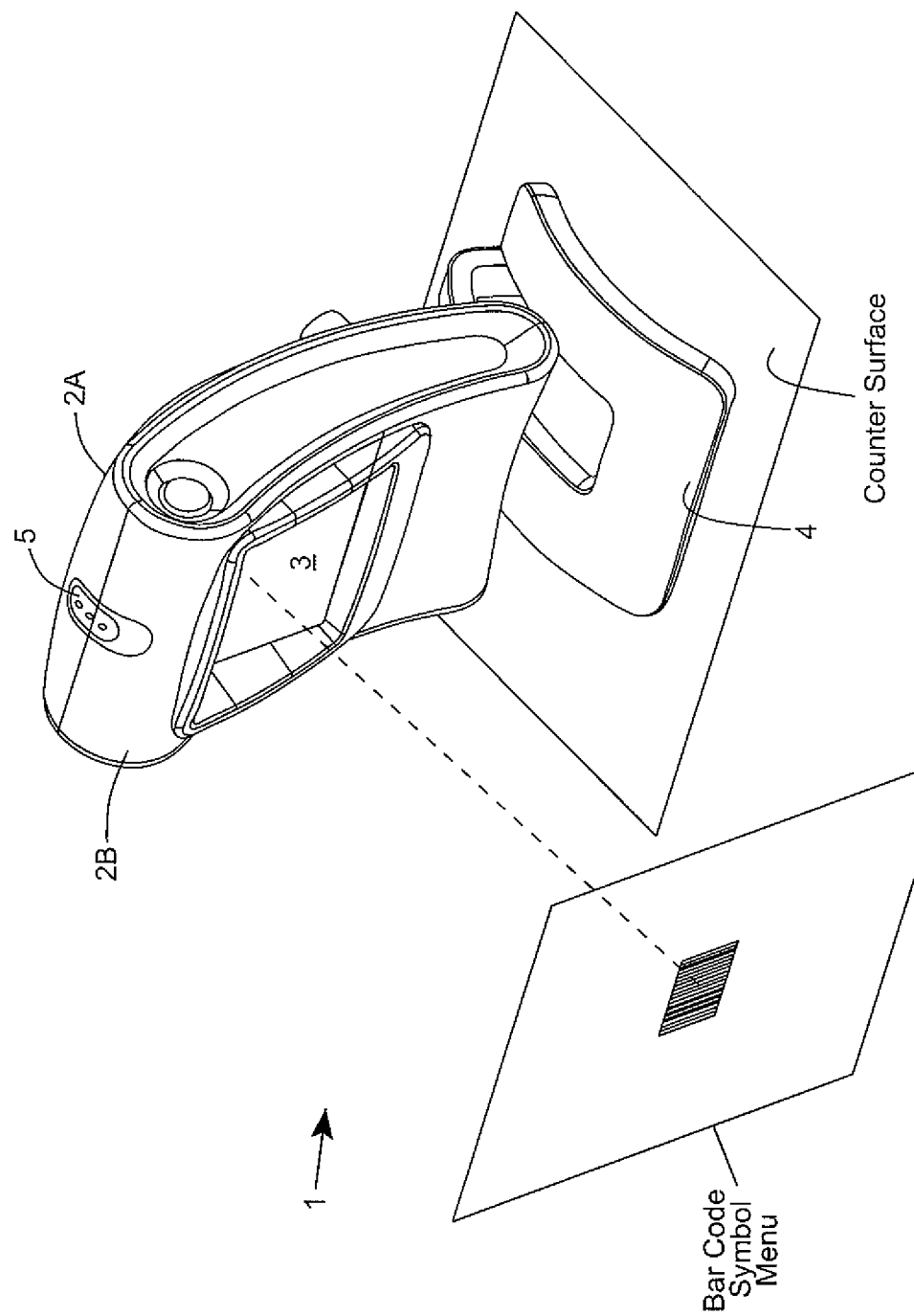
FIG. 4C is a perspective view of the digital imaging system of FIG. 1 shown imaging a barcode menu bearing a plurality of barcode symbols printed on a substrate while the system is resting on a surface.
Figure 4D:
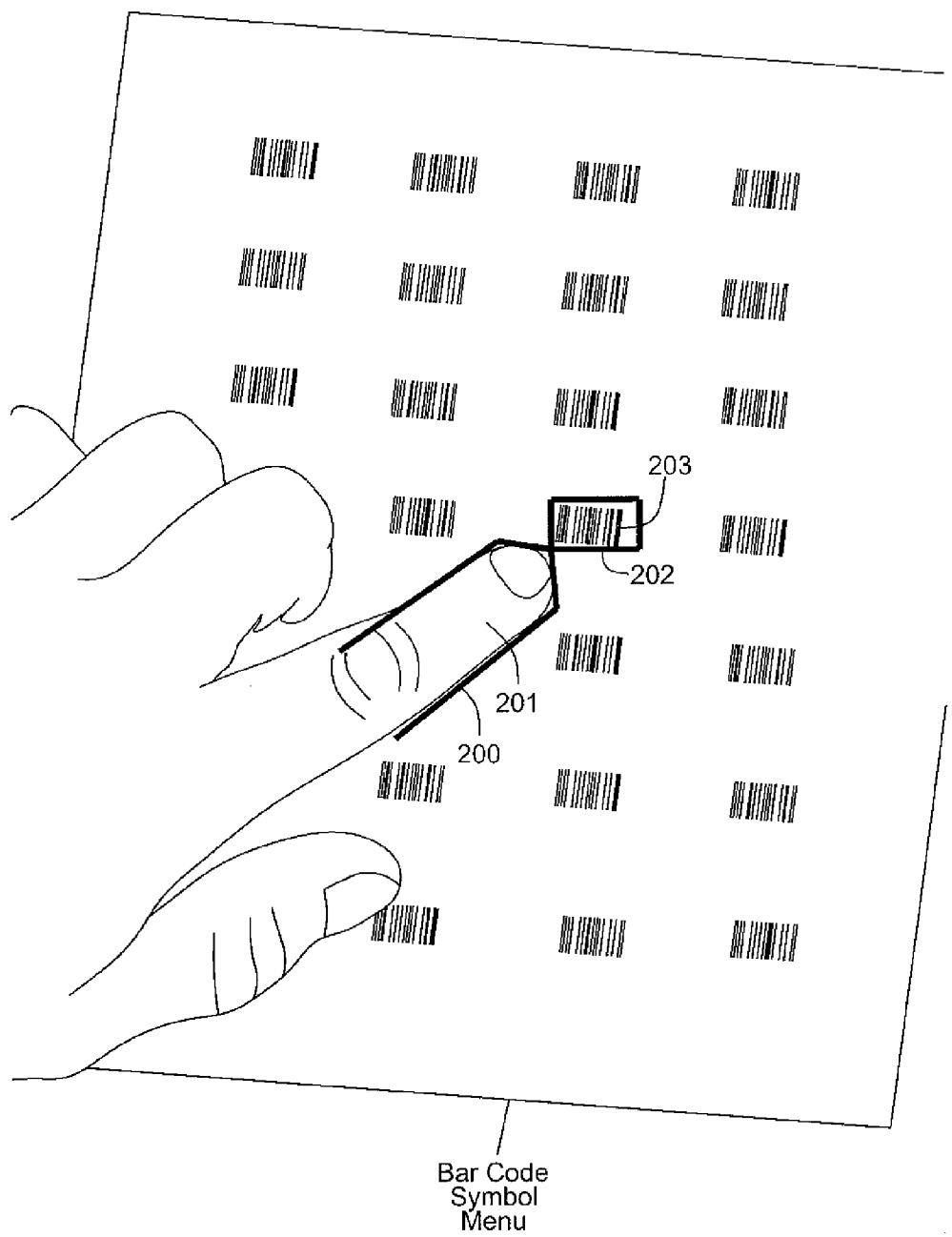
FIG. 4D is an expanded perspective view of the barcode menu illustrated in FIGS. 4A-4C showing the user pointing to a particular barcode symbol on the barcode menu which he or she intends to be automatically read by the digital imaging system.

During the automatic finger-pointing triggered mode of bar code symbol reading operation, the user picks up the system 1 as shown in FIGS. 4B and 4D, and moves the system in proximity with an object bearing a code symbol. The object is automatically detected, causing the object in the FOV to be illuminated with LED-based illumination while digital images thereof are captured in a video mode, and buffered and processed in effort to detect, as shown in FIG. 4, (i) the presence of the user's pointing finger, and (ii) the region of interest (ROI) to which the finger is pointing, so that pixels in the ROI region can be processed in order to read a bar code symbol graphically represented by the pixel data contained in the ROI. This automatic finger-pointing triggered mode of bar code symbol reading operation will be described in greater detail hereinafter with reference to the flow chart shown in FIGS. 5A through 5C.

When operated in its counter-top supportable mode of operation, the system 1 supports an automatically-triggered mode of bar code symbol reading operation, and an automatic finger-pointing triggered mode of bar code symbol reading operation allowing for full hands-free operation.

During the automatically-triggered mode of operation, the user presents an object (i.e. bar code symbol menu) within the FOV of the system, and the object is automatically detected, causing the object in the FOV to be illuminated with LED-based illumination while digital images thereof are captured in a video mode, and buffered and processed in an effort to read the bar code symbol.

During the automatic finger-pointing triggered mode of bar code symbol reading operation illustrated in FIG. 4C, the user presents an object (i.e. bar code symbol menu) within the FOV of the system. The object is automatically detected, causing the object in the FOV to be illuminated with LED-based illumination while digital images thereof are continuously (i.e. periodically) captured in a video mode, and buffered and processed in an effort to detect, as shown in FIG. 4D, (i) the presence of the user's pointing finger, and (ii) the region of interest (ROI) to which the finger is pointing, so that pixels in the ROI region can be processed in order to read a bar code symbol graphically represented by the pixel data contained in the ROI. This automatic finger-pointing triggered mode of bar code symbol reading operation will be described in greater detail hereinafter with reference to the flow chart shown in FIGS. 5A through 5C.

Figure 3:
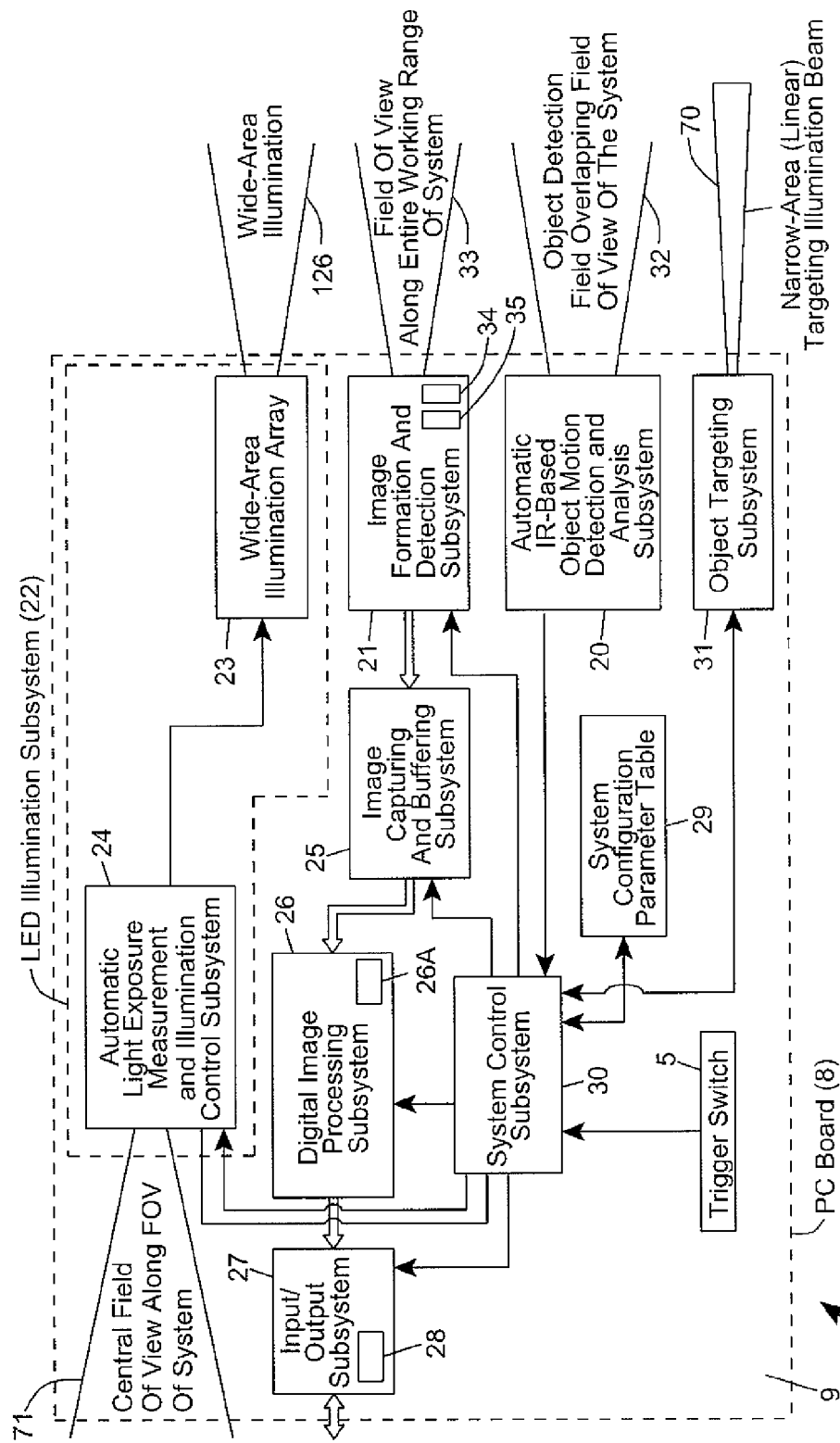
FIG. 3 is a schematic block diagram representative of a system design for the hand-supportable digital imaging system illustrated in FIGS. 1 through 2B, showing its primary system components.

As shown in FIG. 3, the digital-imaging based code symbol reading system 1 comprises a number of subsystem components, namely: an image formation and detection (i.e. camera) subsystem 21 having image formation (camera) optics 34 for producing a field of view (FOV) upon an object to be imaged and a CMOS or like area-type image detection array 35 for detecting imaged light reflected off the object during illumination operations in an image capture mode in which at least a plurality of rows of pixels on the image detection array are enabled; a LED-based illumination subsystem 22 employing a single LED illumination array 32 for producing a field of narrow-band wide-area illumination 126 within the entire FOV 33 of the image formation and detection subsystem 21, which is reflected from the illuminated object and transmitted through a narrow-band transmission-type optical filter 40 realized within the hand-supportable digital imaging system and detected by the image detection array 35, while all other components of ambient light are substantially rejected; an object targeting illumination subsystem 31 as described hereinabove; an IR-based object motion detection and analysis subsystem 20 for producing an IR-based object detection field 32 within the FOV of the image formation and detection subsystem 21; an automatic light exposure measurement and illumination control subsystem 24 for controlling the operation of the LED-based illumination subsystem 22; an image capturing and buffering subsystem 25 for capturing and buffering 2D images detected by the image formation and detection subsystem 21; a digital image processing subsystem 26 (with pointing finger recognition and location movement module 26A) for processing 2D digital images captured and buffered by the image capturing and buffering subsystem 25 and reading 1D and/or 2D bar code symbols represented therein; and an input/output subsystem 27 for outputting processed image data and the like to an external host system or other information receiving or responding device; and a system control subsystem 30 integrated with the subsystems above, for controlling and/or coordinating these subsystems during system operation.

The primary function of the object targeting subsystem 31 is to automatically generate and project a visible linear-targeting illumination beam 70 across the central extent of the FOV of the system in response to either (i) the automatic detection of an object during hand-held imaging modes of system operation, or (ii) manual detection of an object by an operator when s/he manually actuates the manually actuatable trigger switch 5. In order to implement the object targeting subsystem 31, the OCS assembly 78 also comprises a fourth support structure for supporting the pair of beam folding mirrors above a pair of aperture slots (not shown). In turn, these aperture slots are disposed above a pair of visible LEDs arranged on opposite sites of the FOV optics 34 so as to generate a linear visible targeting beam 70 that is projected off the second folding FOV 75 and out the imaging window 3. This arrangement is shown and described in great detail in US Patent Publication No. US20080314985 A1, incorporated herein by reference in its entirety.

The primary function of the object motion detection and analysis subsystem 20 is to automatically produce an object detection field 32 within the FOV 33 of the image formation and detection subsystem 21, to detect the presence of an object within predetermined regions of the object detection field 32, as well as motion and velocity information about the object therewithin, and to generate control signals which are supplied to the system control subsystem 30 for indicating when and where an object is detected within the object detection field of the system. As shown in FIG. 2B, IR LED 90A and IR photodiode 90B are supported in the central lower portion of the optically-opaque structure 133, below the linear array of LEDs 23. The IR LED 90A and IR photodiode 90B are used to implement the automatic IR-based object motion detection and analysis subsystem 20, as taught in US Patent Publication No. US20080314985 A1, supra.

The image formation and detection (i.e. camera) subsystem 21 includes image formation (camera) optics 34 for providing a field of view (FOV) 33 upon an object to be imaged and a CMOS area-type image detection array 35 for detecting imaged light reflected off the object during illumination and image acquisition/capture operations.

The primary function of the LED-based illumination subsystem 22 is to produce a wide-area illumination field 36 from the LED array 23 when an object is automatically detected within the FOV. Notably, the field of illumination has a narrow optical-bandwidth and is spatially confined within the FOV of the image formation and detection subsystem 21 during modes of illumination and imaging, respectively. This arrangement is designed to ensure that only narrow-band illumination transmitted from the illumination subsystem 22, and reflected from the illuminated object, is ultimately transmitted through a narrow-band transmission-type optical filter subsystem 40 within the system and reaches the CMOS area-type image detection array 35 for detection and processing, whereas all other components of ambient light collected by the light collection optics are substantially rejected at the image detection array 35. This provides improved SNR, thus improving the performance of the system.

Figure 2A:
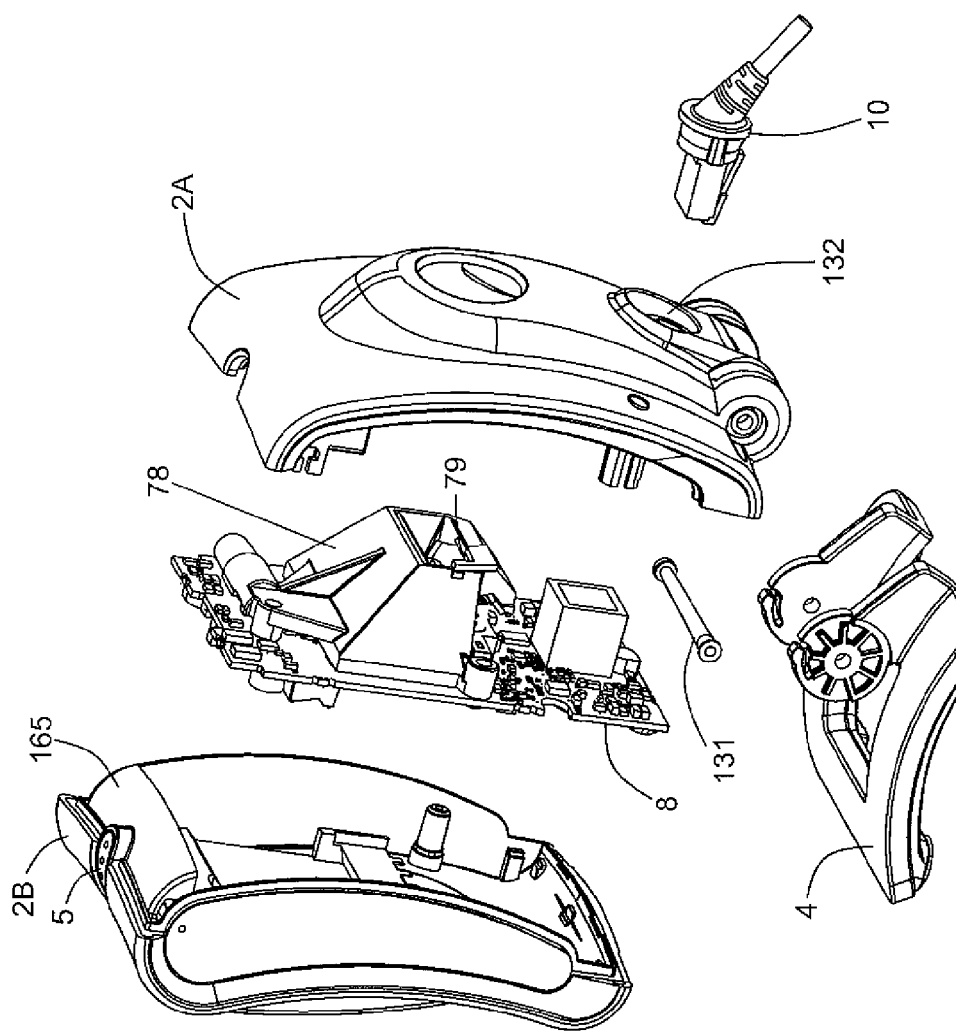
FIG. 2A is a first perspective exploded view of the digital imaging system of the illustrative embodiment illustrated in FIG. 1, showing its PC board assembly arranged between the front and rear portions of the system housing, with the hinged base being pivotally connected to the rear portion of the system housing by way of an axle structure.

The narrow-band transmission-type optical filter subsystem 40 is realized by (1) a high-pass (i.e. red-wavelength reflecting) filter element embodied within the imaging window 3, and (2) a low-pass filter element mounted either before the CMOS area-type image detection array 35 or anywhere beyond the high-pass filter element, including being realized as a dichroic mirror film supported on at least one of the FOV folding mirrors 74 and 75, shown in FIGS. 2A and 2B.

As shown in FIG. 2B, the linear array of LEDs 23 is aligned with an illumination-focusing lens structure 130 embodied or integrated within the upper edge of the imaging window 3. Also, the light transmission aperture 60 formed in the PC board 8 is spatially aligned within the imaging window 3 formed in the front housing portion 2A. The function of illumination-focusing lens structure 130 is to focus illumination from the single linear array of LEDs 23, and to uniformly illuminate objects located anywhere within the working distance of the FOV of the system.

As shown in FIG. 2B, an optically-opaque light ray containing structure 133 is mounted to the front surface of the PC board 8, about the linear array of LEDs 23. The function of the optically-opaque light ray containing structure 133 is to prevent transmission of light rays from the LEDs to any surface other than the rear input surface of the illumination-focusing lens panel 3, which uniformly illuminates the entire FOV of the system over its working range.

When the front and rear housing panels 2B and 2A are joined together, with the PC board 8 disposed therebetween, the illumination-focusing lens panel 3 sits within slanted cut-aways formed in the top surface of the side panels, and illumination rays produced from the linear array of LEDs 23 are either directed through the rear surface of the illumination-focusing lens panel 3 or absorbed by the black colored interior surface of the structure 133.

As shown in FIGS. 2A and 2B the optical component support (OCS) assembly 78 comprises: a first inclined panel for supporting the FOV folding mirror 74 above the FOV forming optics, and a second inclined panel for supporting the second FOV folding mirror 75 above the light transmission aperture 60. With this arrangement, the FOV employed in the image formation and detection subsystem 21, and originating from optics supported on the rear side of the PC board, is folded twice, in space, and then projected through the light transmission aperture and out of the imaging window of the system.

The automatic light exposure measurement and illumination control subsystem 24 performs two primary functions: (1) to measure, in real-time, the power density [joules/cm] of photonic energy (i.e. light) collected by the optics of the system at about its image detection array 35, and to generate auto-exposure control signals indicating the amount of exposure required for good image formation and detection; and (2) in combination with the illumination array selection control signal provided by the system control subsystem 30, to automatically drive and control the output power of the LED array 23 in the illumination subsystem 22, so that objects within the FOV of the system are optimally exposed to LED-based illumination and optimal images are formed and detected at the image detection array 35. The OCS assembly 78 also comprises a third support panel for supporting the parabolic light collection mirror segment 79 employed in the automatic exposure measurement and illumination control subsystem 24. Using this mirror 78, a narrow light collecting FOV is projected out into a central portion of the wide-area FOV 33 of the image formation and detection subsystem 21 and focuses collected light onto photo-detector 81, which is operated independently from the area-type image sensing array, schematically depicted in FIG. 3 by reference numeral 35.

The primary function of the image capturing and buffering subsystem 25 is (1) to detect the entire 2D image focused onto the 2D image detection array 35 by the image formation optics 34 of the system, (2) to generate a frame of digital pixel data for either a selected region of interest of the captured image frame, or for the entire detected image, and then (3) buffer each frame of image data as it is captured. Notably, in the illustrative embodiment, the system supports both single-shot and video modes of imaging. In the single shot mode, a single 2D image frame (31) is captured during each image capture and processing cycle, or during a particular stage of a processing cycle. In the video mode of imaging, which is used to support the novel finger-pointing triggered mode illustrated in FIGS. 5A through 5C, the system continuously captures frames of digital images of objects in the FOV, for subsequently processing the same. These modes are specified in further detail in US Patent Publication No. US20080314985 A1, incorporated herein by reference in its entirety.

The primary function of the digital image processing subsystem 26 is to process digital images that have been captured and buffered by the image capturing and buffering subsystem 25, during modes of illumination and operation. Such image processing operations include imaging-based bar code decoding methods as described in U.S. Pat. No. 7,128,266, incorporated herein by reference.

The primary function of the input/output subsystem 27 is to support universal, standard and/or proprietary data communication interfaces with external host systems and devices, and output processed image data and the like to such external host systems or devices by way of such interfaces. Examples of such interfaces, and technology for implementing the same, are given in U.S. Pat. Nos. 6,619,549 and 6,619,549, incorporated herein by reference in their entirety.

The primary function of the system control subsystem 30 is to provide some predetermined degree of control, coordination and/or management signaling services to each subsystem component integrated within the system, as shown. While this subsystem can be implemented by a programmed microprocessor, in the preferred embodiments of the present invention, this subsystem is implemented by the three-tier software architecture supported on micro-computing platform shown in FIGS. 3 and 13, and described in U.S. Pat. No. 7,128,266, and elsewhere hereinafter.

The primary function of the manually-activatable trigger switch 5 integrated with the housing is to enable the user, during a manually-triggered mode of operation, to generate a control activation signal (i.e. trigger event signal) upon manually depressing the same (i.e. causing a trigger event), and to provide this control activation signal to the system control subsystem 30 for use in carrying out its complex system and subsystem control operations, described in detail herein.

The primary function of the system configuration parameter table 29 in system memory is to store (in non-volatile/persistent memory) a set of system configuration and control parameters (i.e. SCPs) for each of the available features and functionalities, and programmable modes of supported system operation, and which can be automatically read and used by the system control subsystem 30 as required during its complex operations. Notably, such SCPs can be dynamically managed as taught in great detail in copending US Publication No. 20080314985 A1, incorporated herein by reference.

Figure 5A:
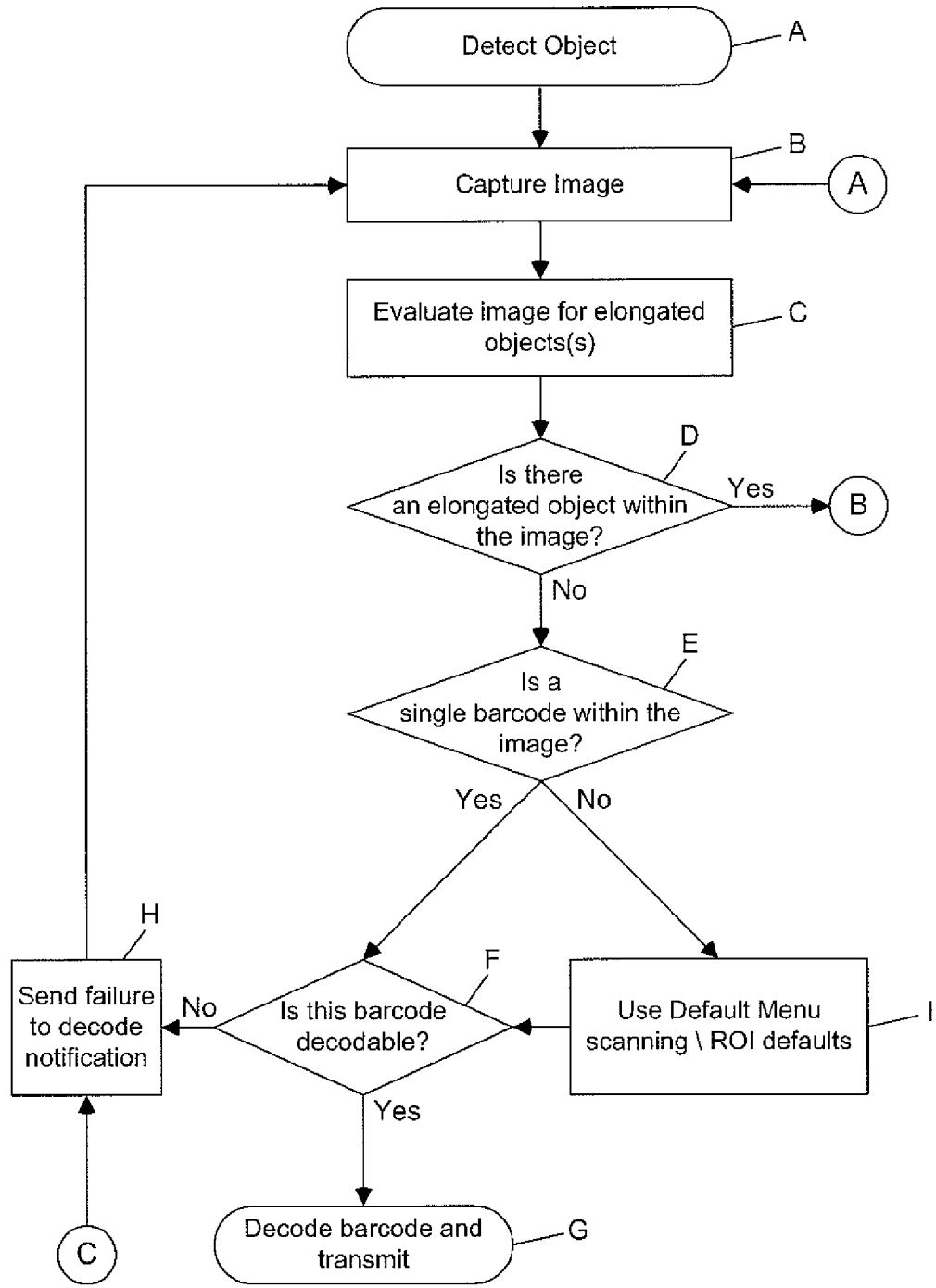
FIGS. 5A through 5C set forth a flow chart setting forth the steps involved in carrying out the finger-directed bar code symbol reading process supported during the bar code symbol reading mode of the digital imaging system shown in FIG. 1.
Figure 5B:
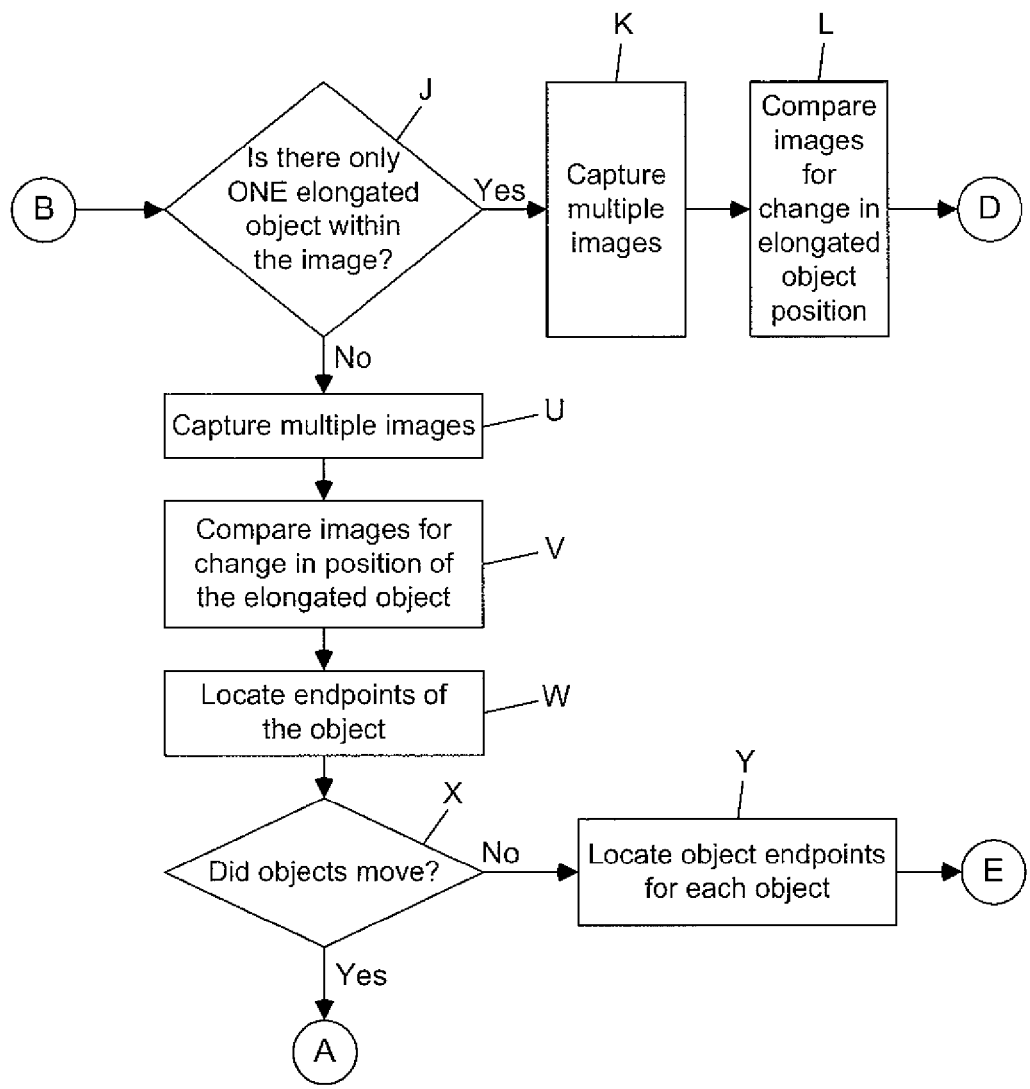
Figure 5C:
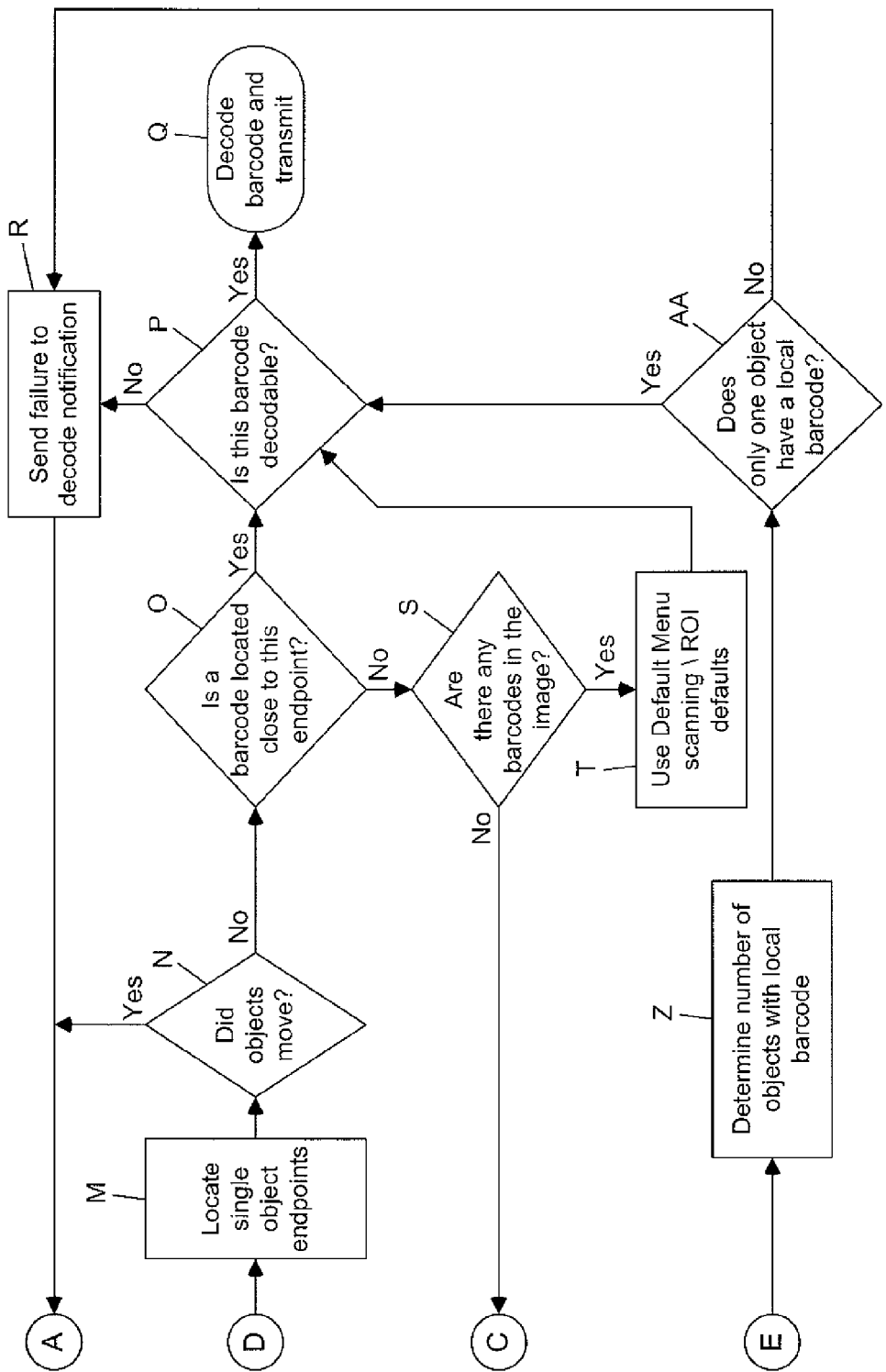

The primary function of the imaging-based finger-pointing module 26A, supported by image processing subsystem 26, is to automatically process captured digital images buffered by the image capture and buffering subsystem 25, and support the image processing operations described in the flow chart of FIGS. 5A through 5C, which is carried out under the control of subsystem 30.

Method of Reading Bar Code Symbols Employing Automated Finer-Pointing Recognition Supported by the Digital-Imaging Based Bar Code Symbol Reading System of the Illustrative Embodiment During hand-supported and hands-free (countertop) supported modes of digital imager operation, in which the finger-pointing triggered method of operation is employed, the system control subsystem 30 carries out the method of control described by the flow chart of FIGS. 5A through 5C.

As indicated at Block A in FIG. 5A, the first step in the process involves automatically detecting an object in the FOV. This will involve detecting the object using the automatic object detection subsystem which can project an IR-based light beam into the FOV and detect a return signal from an object present in the FOV, to detect the same.

Then at Block B, the system captures a digital image of the object in the FOV, and at Block C, evaluates (i.e. analyzes) the digital image in an effort to detect the presence of an elongated object(s) 200 in the digital image, indicative of the presence of a pointing finger 201 in the FOV. This will involve capturing and buffering at least a single frame of digital image data using the image capturing and buffering subsystem 25.

At Block D, the system, employing subsystem 25 and is module 25A, automatically processes digital image data and determines whether or not there is an elongated object in the captured image. If, at Block D, no elongated object is detected in the digital image, then at Block E, the system determines whether or not a single bar code symbol is detected within the digital image. If a single bar code symbol is detected at Block E, then at Block F the system determines whether or not the bar code symbol is decodable, and if so, then at Block G, the system decodes the bar code symbol and sends symbol character data to the host system. If the bar code symbol is not decodable at Block F, then at Block H the system sends a failure to decode notification to the host system, and returns to Block B, as indicated.

If at Block E, the system does not read a single bar code symbol in the captured digital image, then at Block I the system uses the default menu scanning and ROI parameters, and then at Block F reattempts to decode the detected bar code symbol, as shown.

If at Block D, the system does detect an elongated image within the image of the FOV, indicating the presence of a pointing finger in the FOV of the system, then at Block J the system determines whether or not there is only one (1) elongated object 200 detected within the image.

If so, then at Block K the system captures and buffers multiple digital images of the FOV, and at Block L compares the digital images to detect a change in the position of the detected elongated object (i.e. pointing finger). Then, at Block M, the system locates the endpoints of the single elongated object 200, and then at Block N, determines whether or not the object moved. If the system determines that the object did move at Block N, then the system returns to Block A and captures another image and resume processing indicated at Block A in the flow chart.

If at Block N the system determines that the single elongated object (i.e. pointing finger) did not move in the FOV, then the system determines at Block O whether or not a bar code symbol is located/detected in the proximate region 202 close to the endpoint coordinates of the elongated object determined at Block M. If a bar code symbol 203 is detected/located close to the endpoints of the elongated object (i.e. pointing finger), i.e. in the region of interest (ROI) 202 close to the end of the pointing finger 200, then at Block P the system determines whether this bar code is decodable, and if so, then at Block Q, decodes the bar code symbol and transmits the symbol character data to the host system. If the detected bar code symbol is not decodable, then at Block R the system sends a failure to decode notification message and returns to Block B, in the flow chart, as indicated.

If at Block O, the bar code symbol is not detected close to the endpoints of the elongated object (i.e. pointing finger), then at Block S the system determines whether or not any bar code symbols are detected in the image, and if a bar code symbol is detected, then at Block T, the system uses the default menu scanning/ROI defaults, and returns to Block P to determine if the bar code symbol is decodable. If at Block S, the system determines no bar code symbols are detected in the image, then the system returns to Block H and sends a failure to decode notification.

If at Block J the system detects more than one elongated object in the image (i.e. indicative that several fingers are stretched outward and pointing to different regions in the FOV, signifying no intention to point to any particular region containing a bar code symbol), then at Block U, the system captures and buffers multiple digital images of the FOV, and at Block V, compares the digital images in effort to detect change in the position of the elongated objects (i.e. fingers). At Block W, the system locates the endpoints of the elongated objects, and at Block X the system determines whether or not the elongated objects moved within the FOV. If the elongated objects have moved, then the system returns to Block B and captures another image and resume the process indicated in FIG. 5A. However, if the system determines that the elongated objects did not move, then at Block Y, the system (i.e. module 25A) locates the endpoints of each elongated object detected in the digital image, and at Block E, determines the number of elongated objects having end points close to regions containing local bar code symbols (i.e. number of fingers pointing to regions of interest containing bar code symbols). At Block AA, the system then determines if only one elongated object detected in the digital image has end points close to a local bar code (i.e. one finger is pointing to a region of interest containing a bar code symbol), and if this is so, then returns to Block P and determines whether the bar code symbol is decodable. However, if the system determines that more than one elongated object has been detected in the digital image having end points close to a local bar code (i.e. detects that more than one finger is pointing to regions of interest containing a bar code symbol), then the system returns to Block R and sends a failure to decode notification, and then returns to Block B, and the system returns to that point in the control process.

A Few Examples of Intelligent Finger-Pointing Recognition Capabilities when the Digital-Imaging Bar Code Symbol Reading System is Operating in its Finger-Pointing Triggered Mode of Operation When the digital imaging-based system 1 is operating in its finger-pointing trigger mode, in either its hand-supportable or countertop supportable mode of system operation, the user can read a particular bar code symbol on a menu, or any other object, by pointing only a single finger at the particular symbol on a bar code symbol menu, and when this condition is detected, the bar code closest to the end of the user's pointing finger will be automatically read by the system, and symbol character data will be generated and transmitted to the host computing system.

If the user's hand is open, and more than one finger is extended outwardly in a pointing configuration (i.e. and conforming to an extended object), then the system will automatically detect this hand condition, and will not read any bar code symbol on the menu.

While the user's hand has more than one finger pointing outwards across the menu, and the system detects the hand to be either stationary or moving across the menu, then the system will not read any bar code symbol on the menu. However, when the user's hand stops moving across the menu, and the user points only a single finger at the bar code symbol on the menu, then the system will read the bar code symbol closed to the end of the user's pointing finger.

After the user points to a bar code symbol on the menu (i.e. object) and reads a detected bar code symbol, and the user then moves his or her pointing finger to another bar code symbol, which is different from the previously read bar code symbol, the system will automatically detect such conditions during image processing, and automatically read the different bar code symbol, in a consecutive manner without the user moving his or her finger out of the FOV of the system.

These are just a few examples of the intelligent finger pointing recognition capabilities of the system 1, during bar code symbol reading in either a hand-held or hands-free mode of system operation.

Alternative Embodiments

While the illustrative embodiments have been described in connection with various types of bar code symbol reading applications involving 1D and 2D bar code structures, it is understood that the imaging-based systems and methods of the illustrative embodiments can be used to read (i.e. recognize) any machine-readable indicia, dataform, or graphically-encoded form of intelligence, including, but not limited to bar code symbol structures, alphanumeric character recognition strings, handwriting, and diverse dataforms currently known in the art or to be developed in the future. Hereinafter, the term "code symbol" shall be deemed to include all such information carrying structures and other forms of graphically-encoded intelligence.

Also, digital imaging systems of the present disclosure can also be used to detect, capture and process various kinds of graphical images including photos and marks printed on driver licenses, permits, credit cards, debit cards, or the like, in diverse user applications.

Thus, the finger-pointing triggered mode of operation supported by the digital imaging system of the illustrative embodiments can be used to recognize images (using appropriate reference libraries and databases), as well we reading code symbols of diverse symbologies, described above.

In alternative embodiments of the present disclose, the illumination array 23 employed within the illumination subsystem 22 may be realized using solid-state light sources other than LEDs, such as, for example, visible laser diode (VLDs) taught in greater detail in copending US Publication No. 20080283611A1, assigned to Metrologic Instruments, Inc., and incorporated herein by reference in its entirety.

Also, the linear illumination array 23 can be realized using a combination of both visible and invisible illumination sources as taught in great detail in copending US Publication No. 20080283611A1, incorporated herein by reference in its entirety. The use of such spectral mixing techniques will enable the capture of images of bar code labels having high contract, while using minimal levels of visible illumination.

While CMOS image detection array technology was described as being used in the preferred embodiments, it is understood that in alternative embodiments, CCD-type image detection array technology, as well as other kinds of image detection technology, can be used.

The digital imaging system design described in hereinabove can be readily adapted for use as an industrial or commercial mobile and/or fixed-position bar code reader/imager, having the interfaces commonly used in the industrial world, such as Ethernet TCP/IP for instance.

It is understood that the digital image capture and processing technology employed in bar code symbol reading systems of the illustrative embodiments may be modified in a variety of ways which will become readily apparent to those skilled in the art of having the benefit of the novel teachings disclosed herein. All such modifications and variations of the illustrative embodiments thereof shall be deemed to be within the scope of the Claims appended hereto.

What is claimed is:

1. A digital-imaging based code symbol reading system comprising:
   an automatic finger-pointing triggered mode of operation;
   a housing having a light transmission aperture;
   an image formation and detection subsystem, disposed in said housing, having image formation optics for producing and projecting a field of view (FOV) through said light transmission aperture and onto an area-type image detection array for detecting 2D digital images of an object present within said FOV, during object illumination and imaging operations;
   an illumination subsystem, disposed in said housing, including an illumination array for producing a field of illumination within said FOV, and illuminating said object detected in said FOV, so that said illumination reflects off said object and is transmitted back through said light transmission aperture and onto said image detection array to form said 2D digital image of said object;
   an image capturing and buffering subsystem, disposed in said housing, for capturing and buffering 2D digital images detected by said image formation and detection subsystem;
   a digital image processing subsystem for processing said one or more 2D digital images captured and buffered by said image capturing and buffering subsystem and reading 1D and 2D code symbols represented therein, during said automatic finger-pointing triggered mode of operation;
   wherein said digital image processing subsystem includes a pointing finger recognition and movement detection module, for automatically processing captured digital images buffered by said image capture and buffering subsystem, and supporting image processing operations required said automatic finger-pointing triggered mode of operation including automatically detecting the presence of a user's pointing finger and a region of interest (ROI) to which the finger is pointing, so that pixels in said ROI can be processed in order to read a code symbol graphically represented by the pixel data contained in said ROI;
   an input/output subsystem, disposed in said housing, for outputting processed image data to an external host system or other information receiving or responding device; and
   a system control subsystem, disposed in said housing, for controlling and/or coordinating said subsystems during object detection, illumination and imaging operations.

2. The digital-imaging based code symbol reading system of claim 1, wherein said illumination subsystem comprises an array of LEDs.

3. The digital-imaging based code symbol reading system of claim 1, wherein said object is a code symbol menu on which a plurality of code symbols is printed.

4. The digital-imaging based code symbol reading system of claim 1, which further comprises an automatic object detection subsystem, disposed in said housing, for automatically detecting the presence of said object present within said FOV.

5. The digital-imaging based code symbol reading system of claim 1, wherein said housing is a hand-supportable housing, and wherein during said automatic finger-pointing triggered mode of operation, the user picks up said hand-supportable housing, and moves said hand-supportable housing in proximity with an object bearing a code symbol, and said object is automatically detected, causing the object in said FOV to be illuminated with LED-based illumination while digital images thereof are captured in a video mode, and buffered by said image capturing and buffering subsystem and processed by said digital image processing subsystem in effort to detect the presence of the user's pointing finger and said ROI to which the finger is pointing, so that pixels in said ROI can be processed in order to read a code symbol graphically represented by the pixel data contained in said ROI.

6. The digital-imaging based code symbol reading system of claim 1, wherein during the automatic finger-pointing triggered mode of bar code symbol reading operation, the user presents the object within said FOV, and the object is automatically detected, causing the object in said FOV to be illuminated with LED-based illumination while digital images thereof are captured by said image capture and buffering subsystem in a video mode, and buffered by said image capturing and buffering subsystem and processed by said digital image processing subsystem in effort to detect (i) the presence of the user's pointing finger, and (ii) said ROI to which the finger is pointing, so that pixels in said ROI can be processed in order to read a code symbol graphically represented by the pixel data contained in said ROI.

7. The digital-imaging based code symbol reading system of claim 1, wherein the user determines which bar code symbol on said object should be automatically read by said digital image processing subsystem by pointing his or her finger at the particular bar code symbol on said object which he or she intends to be read while digital images of the object are being captured, buffered and processed to recognize the pointing finger and region of interest close to the end points of the pointing finger recognized in said digital images.

8. The digital-imaging based code symbol reading system of claim 1, wherein the user points his or her finger at a code symbol on said object, while said digital image processing subsystem processes said digital images and automatically identifies the pointing finger within the captured digital image, locates said ROI adjacent the detected pointing finger, and decode processes said ROI to read the bar code symbol that is located adjacent to the detected pointing finger.

9. The digital-imaging based code symbol reading system of claim 1, wherein said pointing finger recognition and position detection module automatically detects a pause in the movement of the user's pointing finger, and in response thereto, automatically detects said ROI to which the detected finger is pointing, and attempts to decode one or more code symbol graphically represented in the pixels contained said ROI.

10. The digital-imaging based code symbol reading system of claim 1, wherein after said digital image processing subsystem reads a first bar code symbol in a region of interest (ROI) to which the user points his or her finger, said pointing finger recognition and position detection module automatically detects the movement of the pointing finger in said FOV, and then said digital image processing subsystem reattempts to read another bar code symbol in another region of interest to which the pointing finger points.

11. The method of claim 1, wherein said code symbol is a code symbol selected from the group consisting of 1D bar code symbologies, 2D bar code symbologies, and data matrix symbologies.

12. The digital-imaging based code symbol reading system of claim 1, wherein said housing comprises a hand-supportable housing.

13. A method of recognizing graphical indicia on an object using a digital imaging system having a finger-pointing triggered mode of operation, said method comprising the steps of:

(a) providing a digital imaging system having a housing with a light transmission aperture, and first subsystem for capturing and buffering 2D digital images of an object within a field of view (FOV) defined relative to said housing, and a second subsystem for processing one or more of said 2D digital images during said finger-pointing triggered mode of operation, so as to detect the presence of a pointing finger and the region of interest (ROI) to which the finger is pointing, so that pixels in said ROI can be processed in order to recognize graphical content graphically represented by the pixel data contained in said ROI;

(b) moving said digital imaging system in proximity with an object bearing graphical content so that said object is located within said FOV; and (c) pointing ones finger to particular graphical content on said object while said first subsystem captures and buffers digital images of said object in said FOV and said second subsystem processes said digital images so to detect the presence of the pointing finger and said ROI to which the finger is pointing, so that pixels in said ROI can be processed in order to recognize the graphical indicia graphically represented by the pixel data contained in said ROI.

14. The method of claim 13, wherein said graphical content is a graphical indicia selected from the group consisting of machine-readable indicia, dataform, and graphically-encoded form of intelligence, including, but not limited to bar code symbols, alphanumeric character recognition strings, handwriting, and diverse dataforms.

15. The method of claim 13, wherein said object is a document supporting multiple items of graphical indicia each being recognizable as an item of graphical intelligence.

16. The method of claim 13, wherein said object is a bar code symbol menu supporting multiple bar code symbols.

17. The method of claim 13, wherein the finger-pointing triggered mode of operation is an automatic finger-pointing triggered mode of operation and the second subsystem automatically detects the presence of a pointing finger and the region of interest (ROI) to which the finger is pointing.

18. A digital-imaging based graphical indicia recognition system comprising:

an automatic finger-pointing triggered mode of operation;
a housing having a light transmission aperture;
an image formation and detection subsystem, disposed in said housing, having image formation optics for producing and projecting a field of view (FOV) through said light transmission aperture and onto an area-type image detection array for detecting 2D digital images of an object present within said FOV, during object illumination and imaging operations;
an illumination subsystem, disposed in said housing, including an illumination array for producing a field of illumination within said FOV, and illuminating said object detected in said FOV, so that said illumination reflects off said object and is transmitted back through said light transmission aperture and onto said image detection array to form said 2D digital image of said object;
an image capturing and buffering subsystem, disposed in said housing, for capturing and buffering 2D digital images detected by said image formation and detection subsystem;
a digital image processing subsystem for processing said one or more 2D digital images captured and buffered by said image capturing and buffering subsystem and reading 1D and 2D code symbols represented therein, during said automatic finger-pointing triggered mode of operation;
wherein said digital image processing subsystem includes a pointing finger recognition and movement detection module, for automatically processing captured digital images buffered by said image capture and buffering subsystem, and supporting image processing operations required said automatic finger-pointing triggered mode of operation including automatically detecting presence of a user's pointing finger and a region of interest (ROI) to which the finger is pointing, so that pixels in said ROI can be processed in order to read an item of graphical indicia graphically represented by the pixel data contained in said ROI;

an input/output subsystem, disposed in said housing, for outputting processed image data to an external host system or other information receiving or responding device; and a system control subsystem, disposed in said housing, for controlling and/or coordinating said subsystems during object detection, illumination and imaging operations.

19. The digital-imaging based graphical indicia recognition system of claim 18, wherein said illumination subsystem comprises an array of LEDs.

20. The digital-imaging based graphical indicia recognition system of claim 18, wherein said object is a code symbol menu on which a plurality of code symbols is printed.

21. The digital-imaging based graphical indicia recognition system of claim 18, wherein said graphical content is a graphical indicia selected from the group consisting of machine-readable indicia, dataform, and graphically-encoded form of intelligence, including, but not limited to bar code symbols, alphanumeric character recognition strings, handwriting, and diverse dataforms.

22. The digital-imaging based code symbol reading system of claim 18, which further comprises an automatic object detection subsystem, disposed in said housing, for automatically detecting the presence of said object present within said FOV.

23. The digital-imaging based code symbol reading system of claim 18, wherein said housing comprises a hand-supportable housing.

* * * * *